United States Patent [19]

Inoue

[11] Patent Number: 4,584,450
[45] Date of Patent: Apr. 22, 1986

[54] METHOD OF PREPARING A MACHINING FLUID FOR ELECTROEROSION

[75] Inventor: Kiyoshi Inoue, Tokyo, Japan

[73] Assignee: Inoue-Japax Research Incorporated, Yokohamashi, Japan

[21] Appl. No.: 540,700

[22] Filed: Oct. 11, 1983

Related U.S. Application Data

[62] Division of Ser. No. 963,286, Nov. 24, 1978, abandoned.

[30] Foreign Application Priority Data

Nov. 28, 1977 [JP] Japan .................. 52-142504
Nov. 29, 1977 [JP] Japan .................. 52-143559
Dec. 1, 1977 [JP] Japan .................. 52-144734

[51] Int. Cl.$^4$ .................. B23H 1/08; B23H 1/10
[52] U.S. Cl. .................. 219/69 M; 219/69 D; 210/685

[58] Field of Search .................. 204/129.75, 129.85, 204/129.9, 129.1, DIG. 13; 210/96.1, 167, 663, 668, 685, 686; 219/69 D, 69 M, 69 W

[56] References Cited

U.S. PATENT DOCUMENTS 3,276,458 10/1966 Iversen et al. .................. 210/167
3,928,163 12/1975 Ullmann et al. .................. 219/69 D
3,964,914 6/1976 Bullock et al. .................. 204/129.75

Primary Examiner—Ivars Cintins
Attorney, Agent, or Firm—Karl F. Ross; Herbert Dubno

[57] ABSTRACT

A new method is disclosed for the electroerosion machining of a workpiece by employing as a machining fluid, raw water which has been deionized until its resistivity increases to at least $10^5$ ohm-cm and then decreasing the resistivity of the raw water deionized previously by adding thereto a conductivity modifier substantially free from chloride ions, said conductivity modifier being added to said deionized water in an amount sufficient to impart to the resulting machining fluid a predetermined conductivity.

12 Claims, 2 Drawing Figures

METHOD OF PREPARING A MACHINING FLUID FOR ELECTROEROSION

CROSS REFERENCE TO RELATED APPLICATION

This application is a division of Ser. No. 963,286 filed Nov. 24, 1978 (now abandoned).

FIELD OF THE INVENTION

The present invention relates in general to an electroerosion machining fluid and more particularly to a method of preparing an operating fluid suitable for use in carrying out electroerosion processes.

BACKGROUND OF THE INVENTION

The term "electroerosion" herein used is intended to include electrical discharge machining (EDM) and electrochemical machining (ECM) as well as electrochemical-discharge machining (ECMD) in which the principles of EDM and ECM are combined. The term "machining" is intended to refer to cutting, grinding and boring as well as to shaping with a tool electrode which may be tubular, cylindrical, elogated (wire, band or the like), of a disk-type or generally three-dimensional in shape depending on the particular mode of operation to be performed.

In an electroerosion process, a tool electrode is juxtaposed with a workpiece across a machining gap formed therebetween in the presence of a machining fluid and electrical energy is applied between the electrode and the workpiece to remove material from the latter by means of electrical discharge or electrochemical machining actions or both. As material removal proceeds, the tool electrode is displaced relative to the workpiece to maintain the gap spacing therebetween generally constant with the machining fluid being kept refreshed in the region of the machining gap.

The machining fluid, where it is desirably the aqueous type, has commonly or conveniently made use of municipal water which is utilized in a mixture with an electrolyte to form an ECM or ECDM machining fluid or deionized by an ion-exchange method up to a specific resistivity in the range between $10^3$ and $10^4$ ohm-cm to form an EDM machining fluid. With such machining fluid of the waterbase type, problems arise or the formation of etch pits on the machined surface of a workpiece; this is especially true when the latter is composed of copper, iron or aluminum.

OBJECTS OF THE INVENTION

It is accordingly a principal object of the present invention to provide a method of preparing an aqueous machining fluid for electroerosion whereby the formation of etch pits is substantially eliminated or markedly reduced.

It has now been found after experimentation that the formation of etch pits on machined surfaces is caused basically by the presence of chlorine ions in the machining fluid, the chlorine ions having a high corrosion potential.

SUMMARY OF THE INVENTION

In accordance with the present invention, there is provided a method of preparing a machining fluid for electroerosion, which comprises the steps of: treating a raw water by means of ion-exchange process so that its specific resistivity reaches at least $10^5$ ohm-cm with its chlorine concentration reduced to 1 ppm or less and adding to the treated water a conductivity modifier substantially free from chlorine ions in an amount sufficient to impart to it a predetermined conductivity. The latter in specific resistivity typically ranges between $10^3$ and $10^4$ ohm-cm in EDM, between $10^{-2}$ and $10^{-3}$ ohm-cm in ECM and between $10^{-1}$ and $10^2$ in ECDM.

Specifically, the conductivity modifier may be one or more of nitric, sulfuric, carbonic, phosphoric, acetic and carboxylic acids, Alternatively, it may be one or more of hydroxides of potassium, sodium and ammonium and also suitable is potassium nitrate, potassium nitrite, sodium nitrate, sodium nitrate, sodium carbonate and sodium sulfate.

In addition to the conductivity modifier, the treated or deionized water should preferably incorporate a rust-preventive agent which may comprises a surfactant.

While any of various ion exchangers suitable, i.e. resin, membrane, paper, texile, liquid and inorganic, may be utilized for the deionization step in the present invention, resin type is currently most common and it is preferable to use a combination of cation and anion exchangers of resin type for the purposes of the invention.

An apparatus for carrying out the method according to the present invention comprises an ion-exchangers unit for deionizing a raw water to increase its specific resistivity to at least $10^5$ ohm-cm and means for admixing the deionized water with a conductivity modifier free from chlorine ions in an amount sufficient to render the water of a predetermined conductivity for use as a machining fluid in an electroerosion process.

The machining fluid draining from the erosion zone may be collected and, before recycling into the latter, is replenished with a fresh deionized and conductivity-modified fluid retained in a reservoir. Preferably, the resistivity of the machining fluid is detected to provide a signal for controlling the rate of replenishment or mixing with the fresh fluid to maintain the fluid for delivery to the erosion gap at a predetermined electrical property.

EXAMPLE

Municipal water was treated by an anionic ion exchange deionizer until its specific resistivity increases to $5 \times 10^5$ ohm-cm. The treated water then incorporated 1% by weight sorbitiol or D-sorbitol having the composition $CH_2OH(CHOH)_4CH_2OH$ and 0.01% by weight lauric acid as rust-preventive and surfactant agents and was mixed with sodium hydroxide as conductivity-modifier to the extent its resistivity is reduced to $1 \times 10^4$ ohm-cm. Using this as machining fluid, an SK-8 (tool steel) workpiece of 6 mm thickness was machined by electroerosion with a travelling copper wire electrode of 0.2 mm diameter at a rate of cutting of 5 mm/min. The machined workpiece shows only formation of two etch pits per $mm^2$ at a surface location 2.5 mm spaced from the cutting zone, a significant reduction compared with eight etch pits formed per $mm^2$ at the same location with the conventional simply deionized municipal water of the same resistivity.

In preparing an aqueous type electrical discharge machining fluid, it has been the conventional practice to simply deionize municipal water with a combination of cationic and anionic ion exchange resins until it has a resistivity increased to $1 \times 10^4$ ohm-cm for direct use with the machining process with the result that a considerably high concentration of chlorine ions originally present in the civil water remain existent. In accordance with the present invention, the undesirable formation of etch pits arising from such residual chlorine ions is eliminated or alleviated by virtue of deionization beyond required, followed by reionization with a substantially chlorine free conductivity modifier. Accordingly, machining with an improved surface quality is obtained without deterioration in material removal rate or performance.

The additional use of a rust preventer and surfactant in accordance with the invention serves to facilitate blending of a conductivity modifier with the treated water. With a surfactant adhered as a film on a workpiece surface, rusting during the machining operation is effectively prevented and machining with an aqueous machining fluid is permitted with stability.

BRIEF DESCRIPTION OF THE DRAWING

In the accompanying drawing: fluid

SPECIFIC DESCRIPTION

Figure 1:
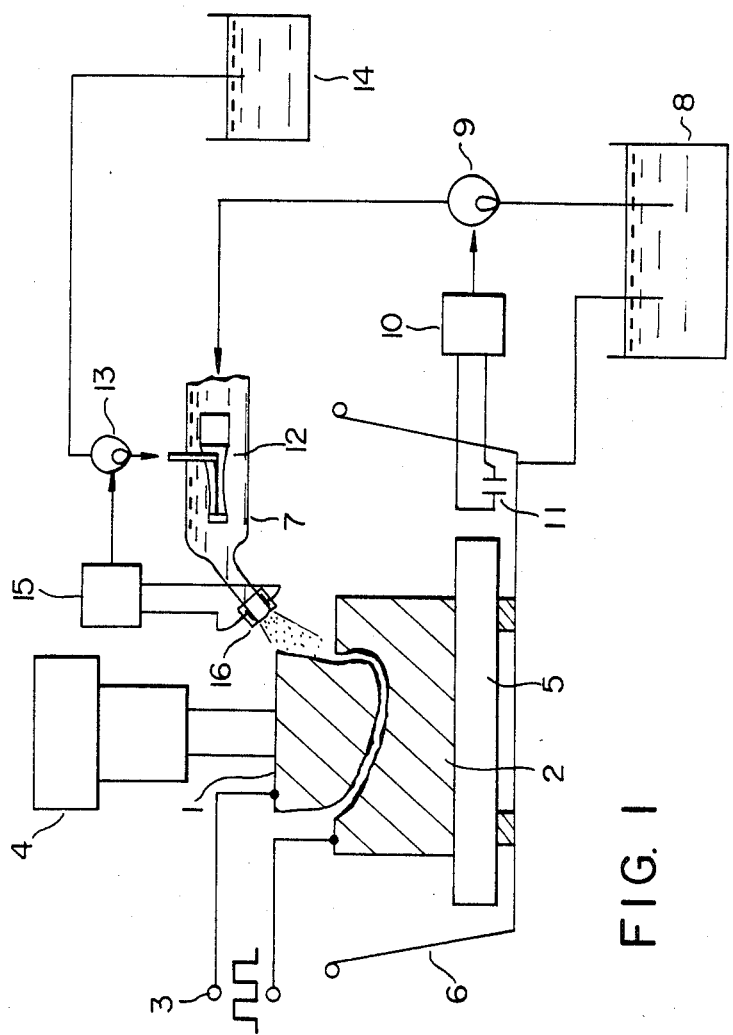
FIG. 1 is a diagrammatic view of a fluid supply unit associated in a certain form with an electroerosion machine tool for embodying the principles of the present invention.

Referring first to FIG. 1, a tool electrode 1 shown having a three-dimensional machining face is juxtaposed with a workpiece 2 and a power supply 3 is electrically connected with the electrode 1 and the workpiece 2. The electroerosion power supply 3 is adapted to deliver electric power in the form of a series of pulses in electrical discharge machining or EDM and generally unidirectional output in ECM or ECDM. In the latter processes, a series of pulses or other modified waveforms may also be utilized.

A feed drive unit 4 is provided supporting the tool electrode 1 and used to maintain the erosion gap between the electrode 1 and the workpiece 2 substantially constant as machining proceeds. The workpiece 2 is here mounted upon a work table 5 in a work tank 6 and a nozzle 7 directed to the machining region to carry a machining fluid into the latter.

The machining fluid collected in the work tank 6 is received by a reservoir 8 wherefrom it is fed by means of a pump 9 to the nozzle 7 for recycling to the machining gap. Although not shown, a filter unit may be provided in a path between the work tank 6 and the nozzle 7 to collect contaminants and impurities from the machining fluid. A flow control unit 10 is responsive to the monotoring by a sensing element 11 of change in pH of the machining fluid which undergoes deterioration or oxidation through the machining gap to control the flow delivery of the pump 9.

In the nozzle 6 there is provided a sonic or ultrasonic vibrator 12 which serves to homogeneously mix the recycling fluid from the pump 9 with fresh fluid fed by means of a pump 13 from a reservoir 14 into the nozzle 6, the fresh fluid being water deionized and treated in accordance with the present invention. A flow control unit 15 for the pump 13 responds to a sensor 16 arranged at the opening of the nozzle 7 which monitors the resistance of the fluid discharged therefrom towards the machining region to control the delivery by the pump 13 of the fresh fluid to be introduced into the recycling fluid.

The machining fluid typically contains as major part either oil (EDM) or water (ECM, EDM). With oil, for example, kerosion used in the principal component, water is admixed therewith to form an emulsion or otherwise. With water in the principal component, the machining fluid should have its resistivity adjusted in the range between $10^3$ and $10^4$ ohm-cm in EDM and in the range between $10^{-2}$ and $10^{-3}$ ohm-cm in ECM after de-chlorination. As noted previously, any of various ion exchanges suitable may be used; it is prefered to use an anionic ion exchanger for the consideration of de-chlorination but a combined anionic/cationic exchanger is also suitable for removal of dissolved metals as well.

It has been noted that deionization of raw water to increase its resistivity to at least $10^5$ ohm-cm permits reduction of chlorine concentration to 1 ppm or less. Thus, the reservoir 14 is here used to store such deionized water with the reservoir 8 storing the water containing a conductivity-modifier which is substantially free from chlorine, that is any of acids, alkalines or salts as listed previously and selected depending on the particular mode of machining desired.

In the course of an electroerosion operation, the aqueous content of the machining fluid evaporates. As a result, change in the resistivity of the machining fluid occurs. The senser 16 responds to this change to operate the control unit 15 which in turn controls the pump 13 to modify the amount of the fluid from the reservoir 14 to be mixed with the fluid from the reservoir 8 so that the conductivity of the mixture for delivery to the machining region is held constant.

Figure 2:
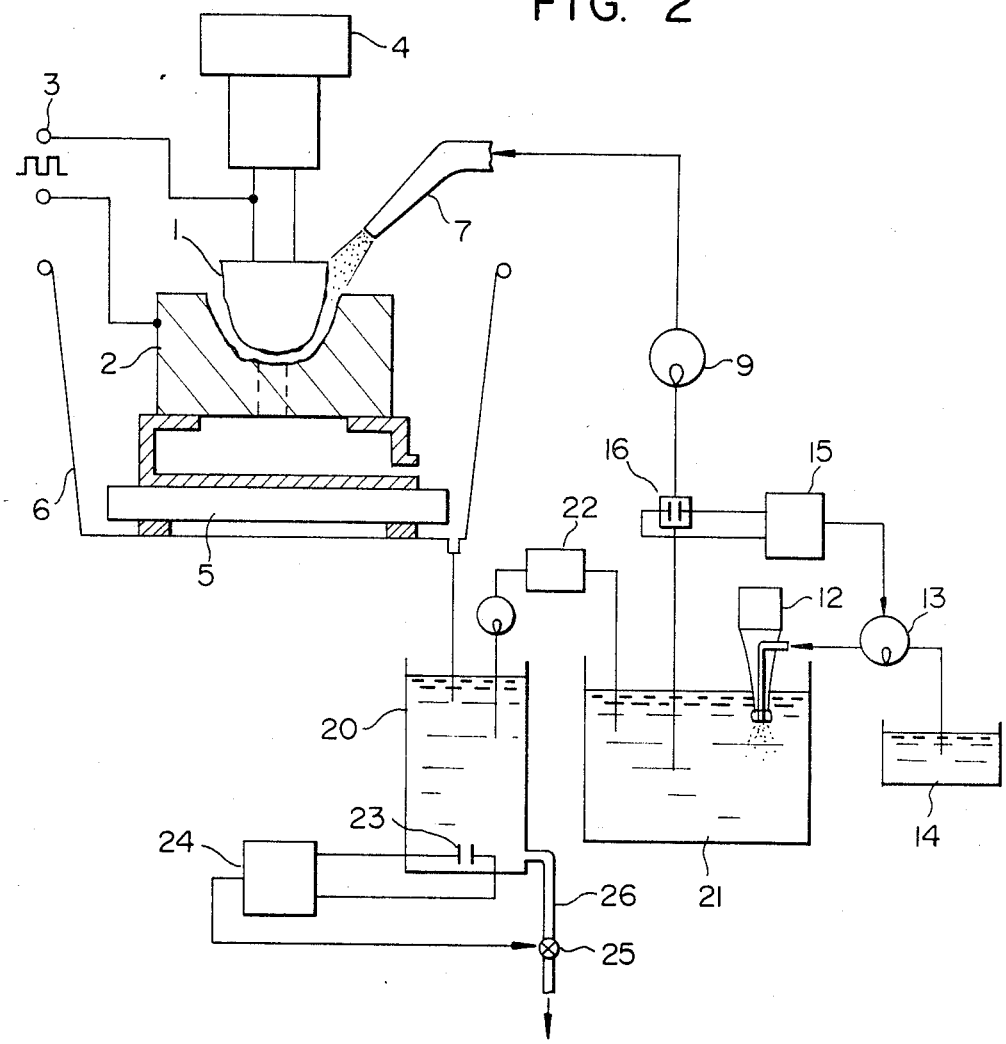
FIG. 2 similarly illustrates a fluid supply system embodied in another form in accordance with this invention.

In the embodiment of FIG. 2 in which the same reference numerals as in FIG. 1 designate the same or similar components, the used machining fluid collected from the work tank 6 is first stored in a sump 20 wherefrom it is fed to a reservoir 21 via a filter 22. The reservoir 21 is also designed to receive a deionized water from a reservoir 14. In this embodiment, the sonic or ultrasonic vibrator 12 is associated with the reservoir 21 and serves to homogeneously mix the fresh water drained from the reservoir 14 by the pump 13 with the machining fluid within the reservoir in which the "washing" if the latter fluid is also thereby effected.

As in the previous embodiment, a conductivity sensor 16 here provided upstream of the pump 9 monitors the machining fluid to be fed to the erosion gap via the nozzle 7 to operate the control unit 15 which in turn regulates the pump 13 so as to maintain the conductivity of the machining fluid substantially constant.

A pH sensor 23 arranged in the reservoir 20 monitors the used machining fluid collected therein and, when the sensed pH value shows a reduction below, say, 4, operative a control unit 24 to cause a valve 25 in the outlet 26 to be open for discharging of the machining fluid for replacement with a refreshed fluid.

There is thus provided, in accordance with the present invention, a new and useful method of preparing a machining fluid in electroerosion as well as an apparatus for executing the method. Disclosed also is electroerosion system embodying the principles of the invention.

I claim:

1. A method of carrying out electrical discharge machining (EDM) on a conductive workpiece, comprising the steps of:

(a) spacedly juxtaposing an EDM tool electrode with the workpiece to define between them an EDM gap flushed with an EDM medium;

(b) drawing from a supply thereof a raw water containing chlorine;

(c) deionizing said raw water containing chlorine until its resistivity increases to at least $10^5$ ohm-cm and its chlorine content is reduced to at most 1 ppm and thereafter decreasing the resistivity of the deionized raw water by adding thereto a conductivity modifier substantially free from chlorine ions in an amount sufficient to impart to the resulting fluid a predetermined conductivity which in terms of resistivity ranges between $10^3$ and $10^4$ ohm-cm;

(d) passing said fluid in a dynamic flow as said EDM medium into and through said EDM gap while effecting a succession of machining electrical discharges between the electrode and the workpiece across the gap to remove stock from the workpiece; and (e) relatively displacing the EDM electrode and the workpiece so that the electrode effectively moves in the workpiece to advance stock removal therein.

2. A method as defined as claim 1, further comprising the steps of collecting in a receptacle the fluid passing out of the EDM gap and containing contaminants discharge-produced therein and recycling the collected fluid into the EDM gap after processing it to remove the contaminants and to substantially restore the conductivity thereof.

3. The method defined in claim 1 or 2 wherein said conductivity modifier comprises at least one compound selected from the group which consists of nitric acid, sulfuric acid, carbonic acid, phosphoric acid, and a carboxylic acid.

4. The method defined in claim 1 or 2 wherein said conductivity modifier comprises at least one compound selected from the group which consists of hydroxides of potassium, sodium and ammonium.

5. The method defined in claim 1 or 2 wherein said conductivity modifier comprises at least one compound selected from the group which consists of potassium nitrate, potassium, nitrate, sodium nitrate, sodium carbonate and sodium sulfate.

6. The method defined in claim 1 or 2 wherein the machining fluid further includes a rust preventive agent.

7. The method defined in claim 1 or 2 wherein the machining fluid further includes a surfactant.

8. The method defined in claim 1 or 2, step (b), wherein the deionization of the raw water is carried out with an anionic exchanger.

9. The method defined in claim 1 or 2, step (b), wherein the deionization of the raw water is carried out with an anionic exchanger and a cationic exchanger.

10. The method defined in claim 1 or 2 wherein said conductivity modifier includes used electroerosion fluid admixed with fresh machining fluid.

11. A method of carrying out electrical discharge machining (EDM) on a conductive workpiece, comprising the steps of:

(a) spacedly juxtaposing an EDM tool electrode with the workpiece to define between them an EDM gap flushed with an EDM medium;

(b) drawing from a supply thereof a water containing an element which deteriorates an EDM result on the workpiece;

(c) deionizing said water containing said element in an ionized form until its resistivity increase to at least $10^5$ ohm-cm and the content of said element therein is reduced to at most 1 ppm and thereafter decreasing the resistivity of the deionized water by adding thereto a conductivity modifer substantially free from ions of said element in an amount sufficient to impart to the resulting fluid a predetermined conductivity which in terms of resistivity ranges between $10^3$ and $10^4$ ohm-cm;

(d) passing said fluid in a dynamic flow as said EDM medium into and through said EDM gap while effecting a succession of machining electrical discharges between the electrode and the workpiece across the gap to remove stock from the workpiece; and (e) relatively displacing the EDM electrode and the workpiece so that the electrode effectively moves in the workpiece to advance the stock removal therein.

12. A method as defined in claim 11, further comprising the steps of collecting in a receptacle the fluid passing out of the EDM gap and containing contaminants discharge-produced therein and recycling the collected fluid into the EDM gap after processing it to remove the contaminants and to substantially restore the conductivity thereof.

* * * * *